(12) United States Patent
Johansson et al.

(10) Patent No.: US 9,374,665 B2
(45) Date of Patent: Jun. 21, 2016

(54) LOCATION OPTION CONTROL FOR MINIMIZATION OF DRIVE TEST IN LTE SYSTEMS

(71) Applicant: MEDIATEK INC., Hsinchu (TW)

(72) Inventors: Per Johan Mikael Johansson, Kungsangen (SE); Tsung-Yu Chiou, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/644,466

(22) Filed: Mar. 11, 2015

(65) Prior Publication Data

US 2015/0189471 A1    Jul. 2, 2015

Related U.S. Application Data

(63) Continuation of application No. 13/744,645, filed on Jan. 18, 2013, now Pat. No. 9,008,687.

(60) Provisional application No. 61/589,250, filed on Jan. 20, 2012.

(51) Int. Cl.
*H04W 4/02* (2009.01)
*H04W 24/08* (2009.01)
(Continued)

(52) U.S. Cl.
CPC ............... *H04W 4/02* (2013.01); *H04W 24/08* (2013.01); *H04W 64/003* (2013.01); *H04W 16/18* (2013.01); *H04W 24/10* (2013.01); *H04W 64/00* (2013.01)

(58) Field of Classification Search
CPC ....... H04W 4/02; H04W 24/02; H04W 36/32; H04W 48/20; H04W 64/00; H04W 88/06
USPC .................. 455/456.1–456.3, 456.6; 370/252
See application file for complete search history.

(56) References Cited

U.S. PATENT DOCUMENTS

| 2007/0281662 A1 | 12/2007 | Kim et al. ................ 455/404.2 |
| 2008/0107051 A1 | 5/2008 | Chen ............................. 370/310 |

(Continued)

FOREIGN PATENT DOCUMENTS

| CN | 101083796 A | 6/2006 |
| CN | 101179849 A | 11/2006 |

(Continued)

OTHER PUBLICATIONS

International Search Report and Written Opinion of International Search Authority for PCT/CN2013/070691 dated Apr. 25, 2013 (11 pages).

(Continued)

*Primary Examiner* — Sam Bhattacharya
(74) *Attorney, Agent, or Firm* — Imperium Patent Works; Zheng Jin

(57) ABSTRACT

A method of providing location option control for Minimization of Drive Test (MDT) in LTE systems is provided. In one embodiment, a UE or an eNB receives an MDT location request that comprises an MDT location option configuration having one or more location options. The UE or eNB determines a first location option based on the MDT location option configuration and initiates positioning for MDT measurements, reporting, and logging according to the first location option. In one novel aspect, each location option is associated with a priority. In addition to MDT measurements, reporting, and logging, a UE determines the best positioning procedure from a list of available location options. In one novel aspect, under a specific positioning objective, the UE prioritizes the list of available location options based on the signal strength and/or quality of cellular and WLAN signals.

18 Claims, 14 Drawing Sheets

(51) Int. Cl.
*H04W 64/00* (2009.01)
*H04W 24/10* (2009.01)
*H04W 16/18* (2009.01)

(56) References Cited

U.S. PATENT DOCUMENTS

2011/0009130 A1   1/2011   Wu ............................ 455/456.1
2013/0005349 A1*  1/2013   Sanders et al. ............. 455/456.1
2013/0115970 A1   5/2013   Hapsari et al. ............. 455/456.1

FOREIGN PATENT DOCUMENTS

| CN | 102056216 A | 11/2009 |
|----|-------------|---------|
| JP | 2011238990 | 4/2010 |
| WO | WO2011097729 A1 | 2/2010 |
| WO | WO2011099909 A1 | 2/2010 |

OTHER PUBLICATIONS

3GPP TSG-RAN2#76 R2-116135, NTT DOCOMO, Inc., MediaTek, Vodafone, CMCC, "Requirements, Priority and Solution for MDT Location Information Enhancement", Nov. 14-18, 2011, San Francisco, USA, sections 1-4.

JPO, Office Action for the JP patent application 2014-549349 dated May 26, 2015 (4 pages).

R2-102904 3GPP TSG-RAN2#70; NTT DOCOMO, Inc.; Location Information for Immediate MDT; Montreal, Canada dated May 10-14, 2010 (2 pages).

R2-102452 3GPP TSG-RAN2#69bis; NTT DOCOMO, Inc.; Location Information in MDT Measurement Report; Beijing, China dated Apr. 12-16, 2010 (2 pages).

R2-104813 3GPP TSG-RAN WG2 #71; Kyocera; Inter-RAT MDT Data Retrieval and MDT (re)-Configuration; Madrid, Spain dated Aug. 23-27, 2010 (5 pages).

MSF Whitepaper on Location services in LTE Networks, MSF-TR-Services-005-Final; The Multi Service Forum; Shedman Tam et al.; Apr. 30, 2010 (19 pages).

Search Report for the EP patent application 13738352.7 dated Dec. 22, 2015 (12 pages).

3GPP TSG-RAN2#76 R2-116135, NTT DOCOMO Inc. et al., Requirements, Priority and Solution for MDT Location Information Enhancement, San Francisco, USA dated Nov. 14-18, 2011 (6 pages).

* cited by examiner

USER EQUIPMENT WITH LOCATION OPTION CONTROL

BASE STATION WITH LOCATION OPTION CONTROL

UE ACTION DURING ONGOING MDT WHEN RECEIVING
MULTIPLE LOCATION OPTIONS

UE ACTION WHEN EVALUATING LOCATION OPTIONS

CONTROL PLANE LOCATION SUBSYSTEM WITH UE-CENTRIC MDT LOGGING – UE PERSPECTIVE

RAN ACTION WHEN RECEIVING MULTIPLE LOCATION OPTIONS
FOR IMMEDIATE MDT

RAN ACTION DURING ONGOING MDT WHEN RECEIVING MULTIPLE
LOCATION OPTIONS FOR IMMEDIATE MDT

CONTROL PLANE LOCATION SUBSYSTEM WITH
eNB-CENTRIC MDT LOGGING – RAN PERSPECTIVE

CONTROL PLANE LOCATION SUBSYSTEM WITH UE-
CENTRIC MDT LOGGING – RAN PERSPECTIVE

MDT LOCATION OPTION CONFIGURATION – UE PERSPECTIVE

MDT LOCATION OPTION CONFIGURATION – ENB PERSPECTIVE

RESPONSE TIME IS THE OBJECTIVE

ACCURACY IS THE OBJECTIVE

POWER CONSUMPTION IS THE OBJECTIVE

DETERMINING THE BEST POSITIONING PROCEDURE BY UE

LOCATION OPTION CONTROL FOR MINIMIZATION OF DRIVE TEST IN LTE SYSTEMS

CROSS REFERENCE TO RELATED APPLICATIONS

This application is a continuation, and claims priority under 35 U.S.C. §120 from nonprovisional U.S. patent application Ser. No. 13/744,645, entitled "Location Option Control for Minimization of Drive Test in LTE Systems," filed on Jan. 18, 2013, the subject matter of which is incorporated herein by reference. Application Ser. No. 13/744,645, in turn, claims priority under 35 U.S.C. §119 from U.S. Provisional Application No. 61/589,250, entitled "MDT Location Option Control," filed on Jan. 20, 2012, the subject matter of which is incorporated herein by reference.

TECHNICAL FIELD

The disclosed embodiments of the present invention relate generally to positioning in wireless communication technology and, more particularly, relate to a method of location option control and a method of determining the best UE-based positioning procedure.

BACKGROUND

To verify and test radio network deployment and operation, drive tests have been conducted in the past. Drive testing typically involves the use of specific measurement tools that could be driven or carried through an area to collect data for network operation verification. Thus, manual testing and verification of radio network operation has been common. For existing and especially for newer networks (e.g. LTE and future networks), it is desirable to reduce the need for drive testing or walk testing to reduce manual testing of networks and therefore reduce operational costs. Accordingly, studies regarding support for minimization of drive tests (MDT) are currently popular which aim to utilize commercial terminals for reporting of relevant measurement results in order to avoid separate manual testing with special test equipments and involvement of operator personnel.

MDT feature enables UEs to perform Operations, Administration, and Maintenance (OAM) activities, such as neighborhood detection, measurements, logging and recording for OAM purposes, which includes radio resource management (RRM) and optimization purposes. There are two types of MDT. For immediate MDT, measurements are performed by the UEs in CONNECTED state for E-UTRA. The collected information is either measured directly in the network or measured in the UE and reported to the network immediately as it becomes available. For logged MDT, measurements are performed and logged by the UEs in IDLE state for E-UTRA. The UEs may report the collected and logged information to the network at a later point of time.

The UE collected measurement information during MDT, in general, may contain location information of the user, or may contain data from which location of the user can be estimated. The location information related to MDT measurements is often highly valuable. For example, the ability to determine that many radio link failures are occurring in a small area of a network cell can allow localized corrective actions that improve quality of service in the small area. MDT thus creates a need for an efficient and active location acquisition control scheme governing how location information related to MDT measurements is acquired.

In current 3GPP systems, the only location option supported is "best effort" location, meaning that UE will attach detail location information (latitude, longitude) if it is available in UE. One problem with the current art is that the nature of the control interface between MDT and location features is still not explored. As there are many flavors of positioning, e.g., U-Plane location as defined by OMA, C-Plane LCS by 3GPP, UE internal positioning, and a number of different positioning methods, the problem of how to control positioning is not trivial. In current 3GPP radio access systems, there is no feature for which it is needed to do selection of LCS systems and UE stand-alone location. Furthermore, the entities that can do UE selection for MDT are largely unaware of UE capabilities with respect to location. For example, eNB and OAM do not know UE capabilities, and RNC can know C-Plane LCS capabilities, but does not know U-Plane LCS capabilities. Therefore, it is difficult to perform location option control in an efficient way.

It is an objective of the current invention to provide a novel design that addresses the problems of prior art. It is an objective to propose solutions for addressing the non-knowledge of location related capabilities. It is an objective to propose a general set of information elements to control the selection of location options for MDT that is future-proof, and to maximizes the reuse of existing positioning functionality that ties together the current MDT best effort location concept, the on-demand/requested location concept, and the enhanced best effort location.

Location information is not only important to MDT measurements, but also an important feature for mobile users. In addition to cellular networks, there are other networks able to deliver location information to mobile users. In most geographic areas, multiple radio access networks (RANs) such as E-UTRAN and wireless local area network (WLAN) are usually available. Furthermore, wireless communication devices are increasingly being equipped with multiple radio transceivers for accessing different radio access networks. For example, a multiple radio terminal (MRT) may simultaneously include Bluetooth, LTE, and WiFi radio transceivers. Accordingly, more positioning methods become available to UE. Among the various positioning methods, UE has the knowledge to choose the best positioning method before the network is involved. It is another objective of the current invention to utilize the characteristics of a network condition in determining the best positioning procedure.

SUMMARY

A method of providing location option control for Minimization of Drive Test (MDT) in LTE systems is provided. In one embodiment, a UE or an eNB receives an MDT location request that comprises an MDT location option configuration having one or more location options. The UE or eNB determines a first location option based on the MDT location option configuration and initiates positioning for MDT measurements, reporting, and logging according to the first location option. In one novel aspect, each location option is associated with a priority. In one embodiment, the UE/eNB receives the MDT location request during ongoing MDT session.

In addition to MDT measurements, reporting, and logging, a UE determines the best positioning procedure from a list of available location options. In one novel aspect, under a specific positioning objective, the UE prioritizes the list of available location options based on the signal strength and/or quality of cellular LTE cell and WLAN signals. The positioning objective includes response time, accuracy, and power consumption. By prioritizing and predefining different location options based on the positioning objective, the UE is able to use the best positioning procedure under different UE environment and network condition.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
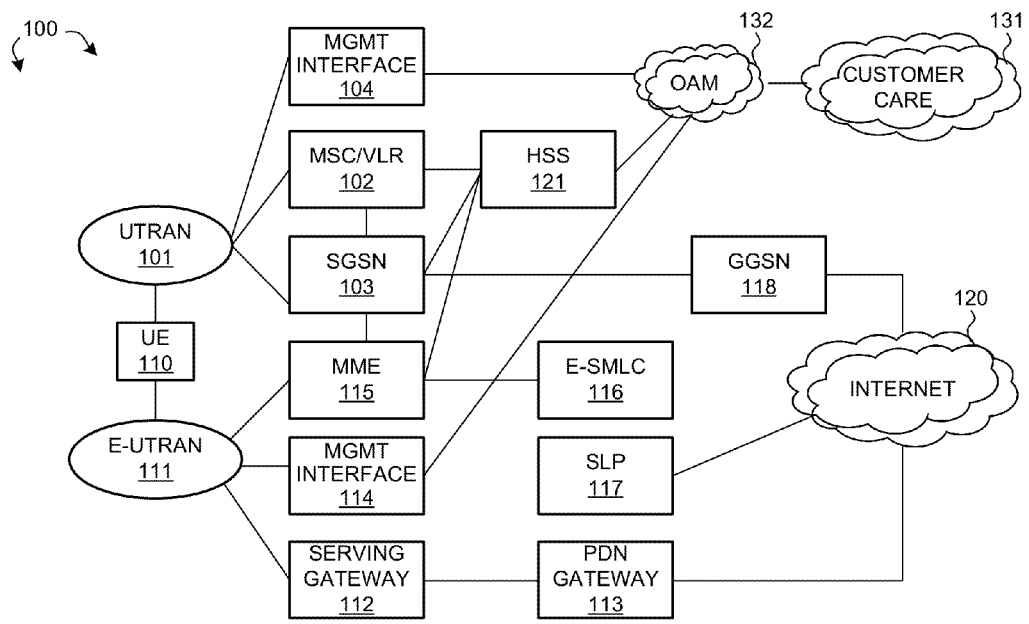
FIG. 1 illustrates a 3GPP system architecture in accordance with one novel aspect.

FIG. 1 illustrates a 3GPP system 100 architecture in accordance with one novel aspect. 3GPP system 100 comprises an UTRAN radio access network 101, a Mobile Switching Centre or a Visitor Location Register (MSC/VLR) 102, a Serving GPRS (General Packet Radio Service) Support Node (SGSN) 103, an UTRAN management interface 104, a User Equipment UE 110, an E-UTRAN radio access network 111, a Serving Gateway S-GW 112, a Packet Data Network (PDN) Gateway PDN-GW 113, an E-UTRAN management interface 114, a Mobility Management Entity (MME) 115, an eSMLC (evolved Serving Mobile Location Center) server 116, a SUPL (Secure User Plane Location) Location Platform (SLP) 117, a Gateway GPRS support node (GGSN) 118, an operator's IP services (e.g., the Internet) 120, a Home Subscriber Server (HSS) 121, a Customer Care Center 131, and an Operation, Administration, and Maintenance (OAM) system 132. In the example of FIG. 1, E-UTRAN 111 provides a new air interface for cellular services to UE 110 via OFDMA (Orthogonal Frequency Division Multiple Access) technology. E-UTRAN 111 may also provide IP services to UE 110 through S-GW 112 and P-GW 113. On the other hand, UTRAN 101 is an UMTS radio access network that provides connectivity between UEs and the network via W-CDMA (Wideband Code Division Multiple Access) technology.

In 3GPP LTE systems, HSS 121, S-GW 112, and PDN-GW 113, MME 115, eSMLC 116 and other nodes (not shown) form an evolved packet core network, while the evolved packet core network and E-UTRAN 111 together form a Public Land Mobile Network (PLMN). In 3GPP UTRA systems, HSS 121, MSC 102, SGSN 103, GGSN 118 and other nodes (not shown) form a core network. UTRAN 101 and the core network together form a Public Land Mobile Network (PLMN). Standardized by Open Mobile Alliance (OMA) and by SUPL, the SLP server 117 provides location services for UEs connected by any Access Technology. While E-UTRAN and UTRAN radio access networks are described above, one skilled in the art will appreciate that other radio access networks may be improved by the present invention.

3GPP introduces new features to help LTE and UTRA system operators to further optimize network planning in a cost-effective way. Minimization of Drive Test (MDT) is one of the features where UEs collect measurements and report measurement information to the network. MDT feature enables UEs to perform Operations, Administration, and Maintenance (OAM) activities, such as neighborhood detection, measurements, logging and recording for OAM purposes, which includes radio resource management (RRM) and optimization purposes. There are two types of MDT. For immediate MDT, measurements are performed by the UEs in CONNECTED state for E-UTRA. The collected information is either measured directly in the network or measured in the UE and reported to the network immediately as it becomes available. For logged MDT, measurements are performed and logged by the UEs in IDLE state for E-UTRA. The UEs may report the collected and logged information to the network at a later point of time.

The UE collected measurement information (also referred to as event information), in general, may contain MDT measurement information, radio measurements, logs of broadcast communication failure information, logs of multicast communication failure information, logs of Random Access Channel (RACH) performance, and logs of communication problems including Radio Link Failure (RLF), Handover Failure (HOF), and Radio Resource Control (RRC) Connection Establishment Failure. For example, RAN logs of immediate MDT, logs of logged MDT, and logs of problem events such as RLF and HOF, may all contain location and velocity information or data from which location and velocity can be estimated. MDT thus creates a need for an efficient control interface for governing how a UE acquires location information and shares the location information with the network.

Figure 2:
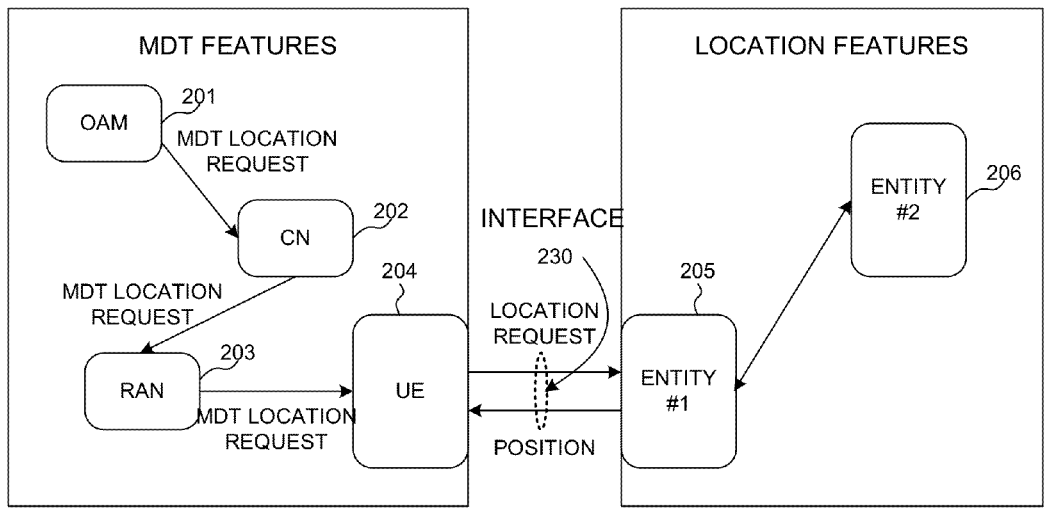
FIG. 2 illustrates an interface for handling MDT location request in accordance with one novel aspect.

FIG. 2 illustrates an interface for handling MDT location request in accordance with one novel aspect. In the example of FIG. 2, MDT features are initiated from an OAM system 201, which transmits an MDT location request to a core network CN 202. CN 202 forwards the MDT location request to RAN 203, which in turn sends the MDT location request to UE 204. The MDT location request represents a set of MDT information elements used to control initiation of location for MDT. The notation "MDT location request" is used both for network signaling and signaling over the air interface to the UE. In principle, however, there could be slight differences in information contents of network MDT location request and Uu MDT location request. The MDT location request is originated from the OAM system, and is terminated in the UE or RAN.

As illustrated in FIG. 2, from system architecture perspective, the MDT features and the location features communicate via an interface 230. In accordance with one novel aspect, the MDT location request contains one or more location options that the location features may perform. Accordingly, the location features may contain one or more entities (e.g., entity#1 and entity#2) that perform the actual positioning procedure. For example, the entities may be UE, RAN, eSMLC for C-Plane LCS, and/or SLP for U-Plane LCS. In FIG. 2, the MDT location request is sent from UE 204 to a first entity#1 205 via interface 230, and entity#1 205 in turn sends additional location related messages to a second entity#2 206. After performing a specific positioning procedure and obtaining the UE position, the UE position is sent from entity#1 205 back to UE 204 via interface 230.

Figure 3:
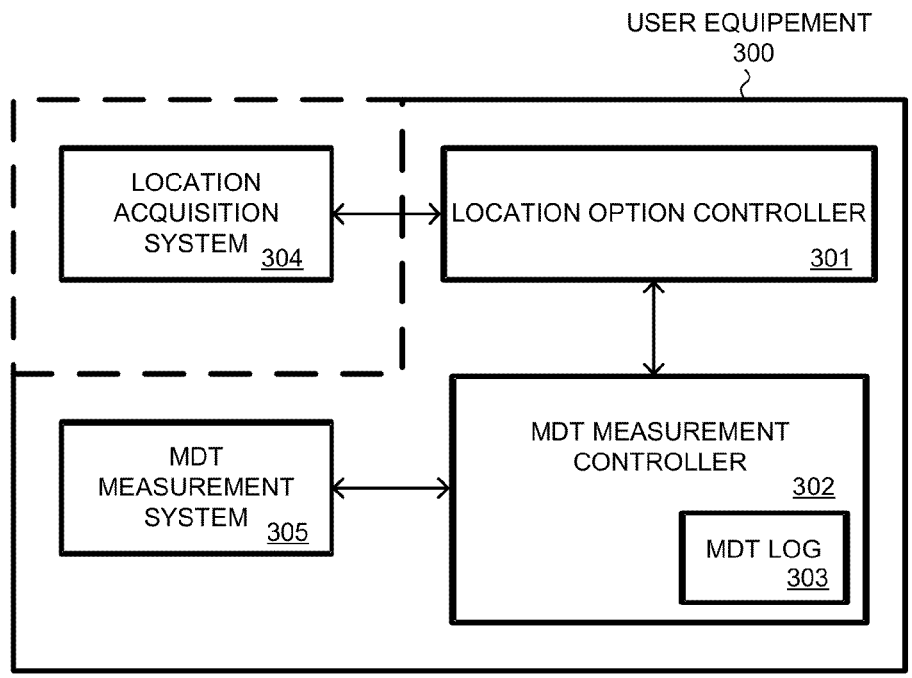
FIG. 3 is a diagram of a UE with location acquisition control.

FIG. 3 is a diagram of a user equipment UE 300 with location option control mechanism. UE 300 comprises a location option controller 301, a Minimization of Drive Test (MDT) controller 302, an MDT log 303, and an MDT measurement system 305. In one embodiment, UE 300 further comprises a location acquisition system 304. In another embodiment, location acquisition system 304 is located outside of UE 300. This variation in UE configuration is illustrated by use of dashed line shown in FIG. 3. Location option controller 301 determines how location information is to be acquired. If so determined, location option controller 301 sends location option configuration to location acquisition system 304 and subsequently receives location information from location acquisition system 304. Location option controller 301 then communicates the location information to MDT measurement controller 302. MDT measurement controller 302 sends instructions to MDT measurement system 305 and subsequently receives measurement information from MDT measurement system 305. MDT measurement controller 302 then stores both the MDT measurement information and the location information in MDT log 303.

Figure 4:
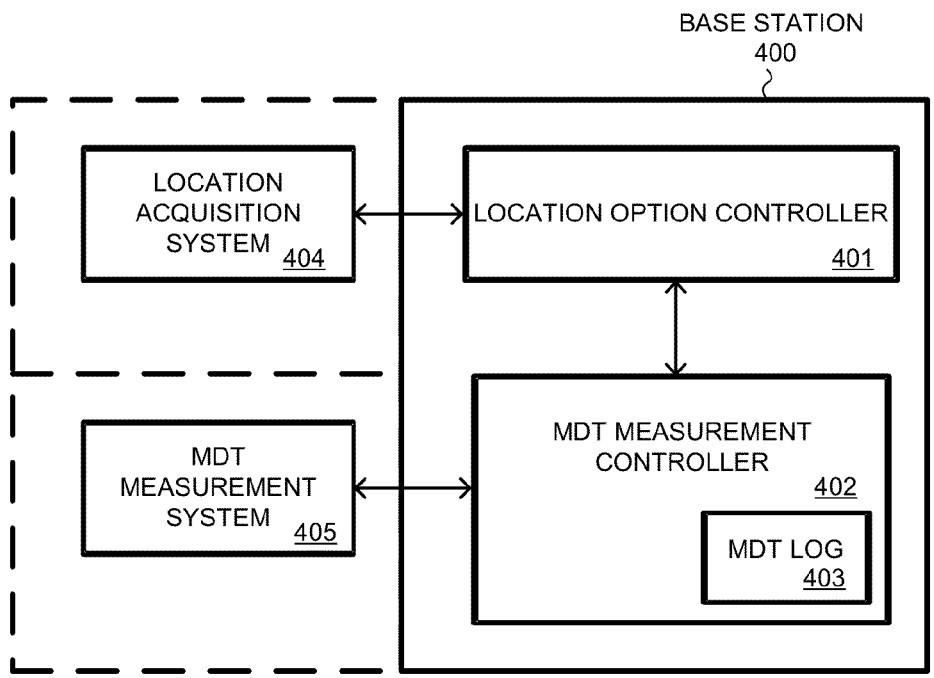
FIG. 4 is a diagram of a base station with location option control.

FIG. 4 is a diagram of a base station eNB 400 with location option control mechanism. Base station 400 comprises a location option controller 401, a Minimization of Drive Test (MDT) controller 402, and an MDT log 403. In one embodiment, eNB 400 further comprises a location acquisition system 404. In another embodiment, location acquisition system 404 is located outside of eNB 400. In another embodiment, eNB 400 further comprises MDT measurement system 405. In yet another embodiment, MDT measurement system 405 is located outside of eNB 400. This variation in base station configuration is illustrated by use of dashed line shown in FIG. 4. Location option controller 401 determines how location information is to be acquired. If so determined, location option controller 401 sends location option configuration to location acquisition system 404 and subsequently receives location information from location acquisition system 404. Location option controller 401 then communicates the location information to MDT measurement controller 402. MDT measurement controller 402 sends instructions to MDT measurement system 405 and subsequently receives measurement information from MDT measurement system 405. MDT measurement controller 402 then stores both the MDT measurement information and the location information in MDT log 403.

Location option controllers 301 and 401 may be implemented in hardware, software, firmware, or any combination thereof. In one embodiment, location option controllers 301 and 401 could be implemented as a hardware state machine. In another embodiment, location option controllers 301 and 401 could be computer readable medium that have programming codes for determining how to acquire location information.

Location acquisition systems 304 and 404 may be an array of location acquisition systems. In one embodiment, the location acquisition system is located in the UE and is a Global Navigation Satellite System (GNSS). In another embodiment, the location acquisition system is an Observed Time Difference of Arrival (OTDOA) system. Other location acquisition systems include cell identification systems based on 3GPP cells, Wifi Cells or other short-range cells, enhanced cell identification based positioning systems (e.g., E-CID), and UE sensor based positioning systems (e.g., MEMS positioning).

Reusing standardized frameworks for positioning, the following systems could also be regarded as location acquisition systems: a) Control plane Location subsystem (C-PLANE LCS)—standardized by 3GPP and controlled by an eSMLC server, b) User Plane Location Subsystem (U-PLANE LCS) aka SUPL standardized by OMA (and partly by 3GPP) and controlled by an SLP server. A Location Client can ask for UE location using such system, and the eSMLC or SLP will select appropriate positioning method and deliver the UE location information. Note that U-PLANE LCS and C-PLANE LCS can be used in an alternative manner and could additionally be regarded as support system to another location acquisition system, providing only assistance data, e.g. for UE-based GNSS positioning or LTE-based OTDOA positioning.

Figure 5:
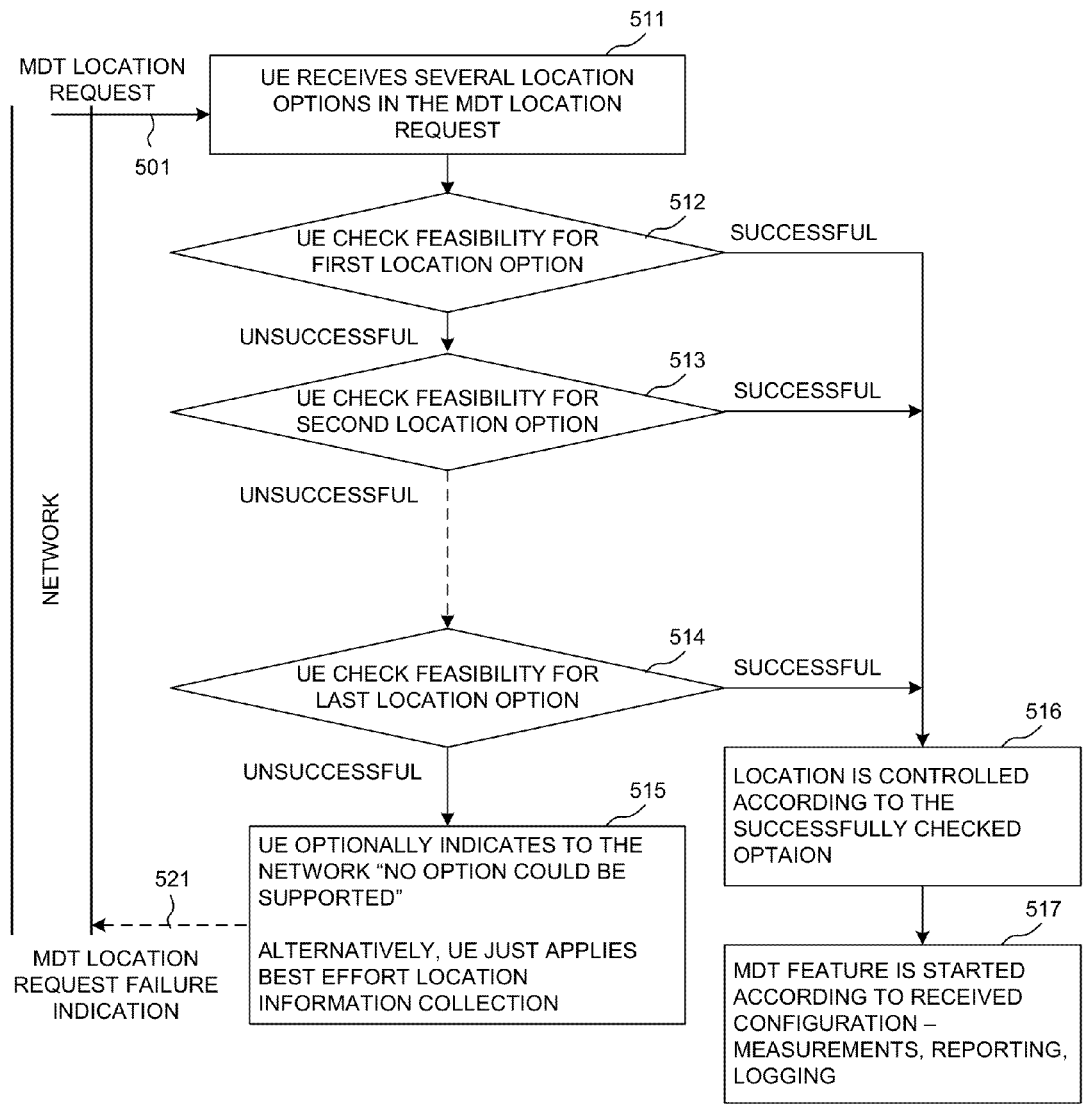
FIG. 5 illustrates UE action when receiving multiple location options.

FIG. 5 illustrates UE action when receiving multiple location options in a mobile communication network. In step 501, the network sends an MDT location request to a UE. In step 511, the UE receives the MDT location request comprises an MDT location option configuration. The MDT location option configuration contains multiple location options. For example, the location options are 1) UE GNSS, 2) OTDOA, and 3) C-PLANE LCS in a prioritized order. In step 512, the UE checks feasibility for the first location option (e.g., UE GNSS). If the UE supports GNSS, then the UE determines that location acquisition is controlled according to the successfully checked UE GNSS in step 516. In step 517, MDT feature is started according to received MDT configuration including MDT measurements, reporting and logging. On the other hand, if the UE does not support GNSS, then the UE checks feasibility for the second location option (e.g., OTDOA) in step 513. If the check is successful, then the UE goes to steps 516 and 517. If the check is unsuccessful, then the UE checks the feasibility of the next location option and so on so forth. In step 514, the UE checks the feasibility of the last location option (e.g., C-PLANE LCS). If the check is successful, then the UE goes to steps 516 and 517. If the check is unsuccessful, then the UE optionally indicates to the network that no location option could be supported or similar in step 515. Alternatively, the UE just applies best effort location information collection. In step 521, the network receives a response that indicates the failure of the MDT location request.

Figure 6:
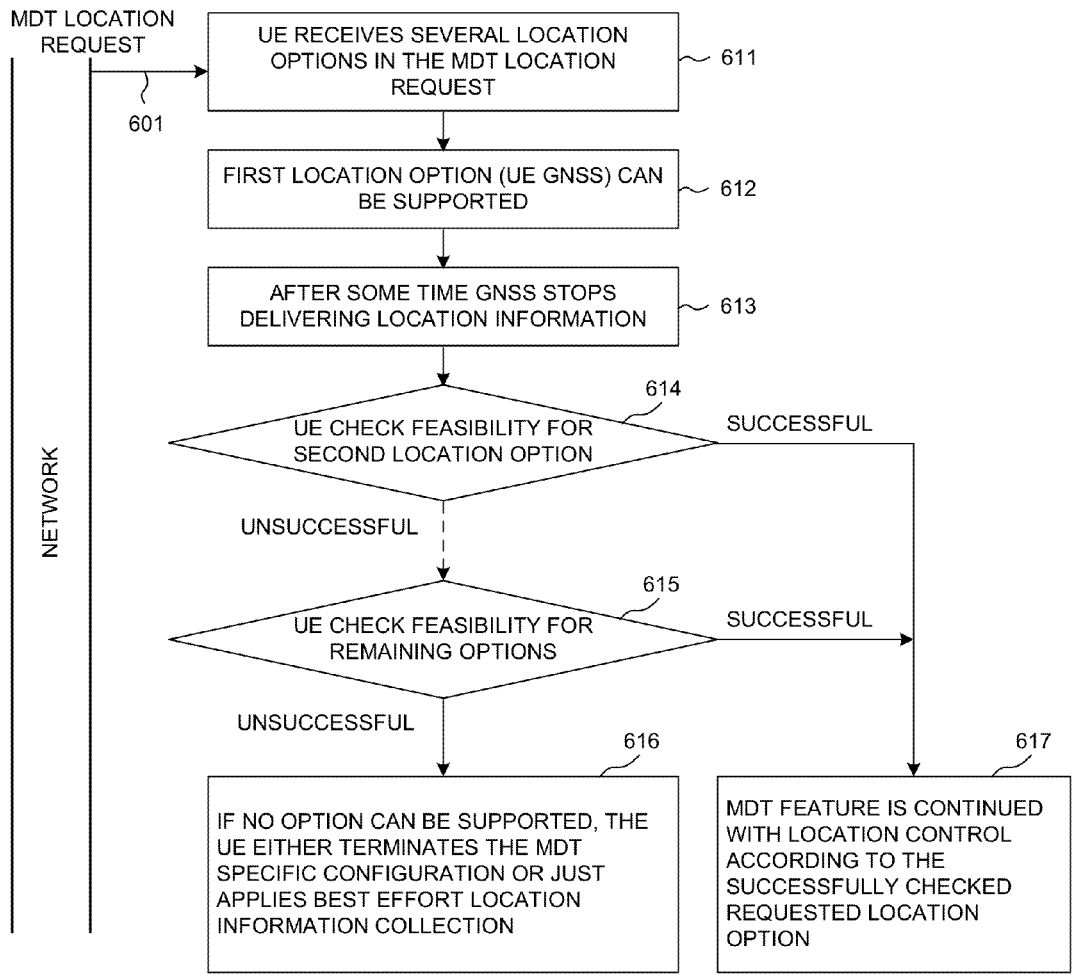
FIG. 6 illustrates UE action during ongoing MDT when receiving multiple location options.

FIG. 6 illustrates UE action during ongoing MDT when receiving multiple location options in a mobile communication network. In step 601, the network sends an MDT location request to a UE. In step 611, the UE receives the MDT location request comprises an MDT location option configuration. The MDT location option configuration contains multiple location options. For example, the location options are 1) UE GNSS, 2) OTDOA, and 3) C-PLANE LCS in a prioritized order. In step 612, the UE checks feasibility for the first location option (e.g., UE GNSS) and determines that GNSS can be supported. MDT is thus started using GNSS location option for positioning. After some time, in step 613, GNSS stops delivering location information. For example, due to out of GNSS coverage. The UE then concludes that GNSS can no longer be supported. In step 614, the UE checks the feasibility for the second location option (e.g., OTDOA). If the check is successful, then the UE goes to step 617. MDT feature is continued with location controlled according to the successfully checked and requested location option, e.g., the UE starts to perform OTDOA measurements. On the other hand, if the check is unsuccessful, then the UE goes to check the next location option and so on so forth for the remaining options. If no location option can be supported, then the UE goes to step 616. The UE either terminates the MDT specific configuration, or just applies best effort location information collection.

Figure 7:
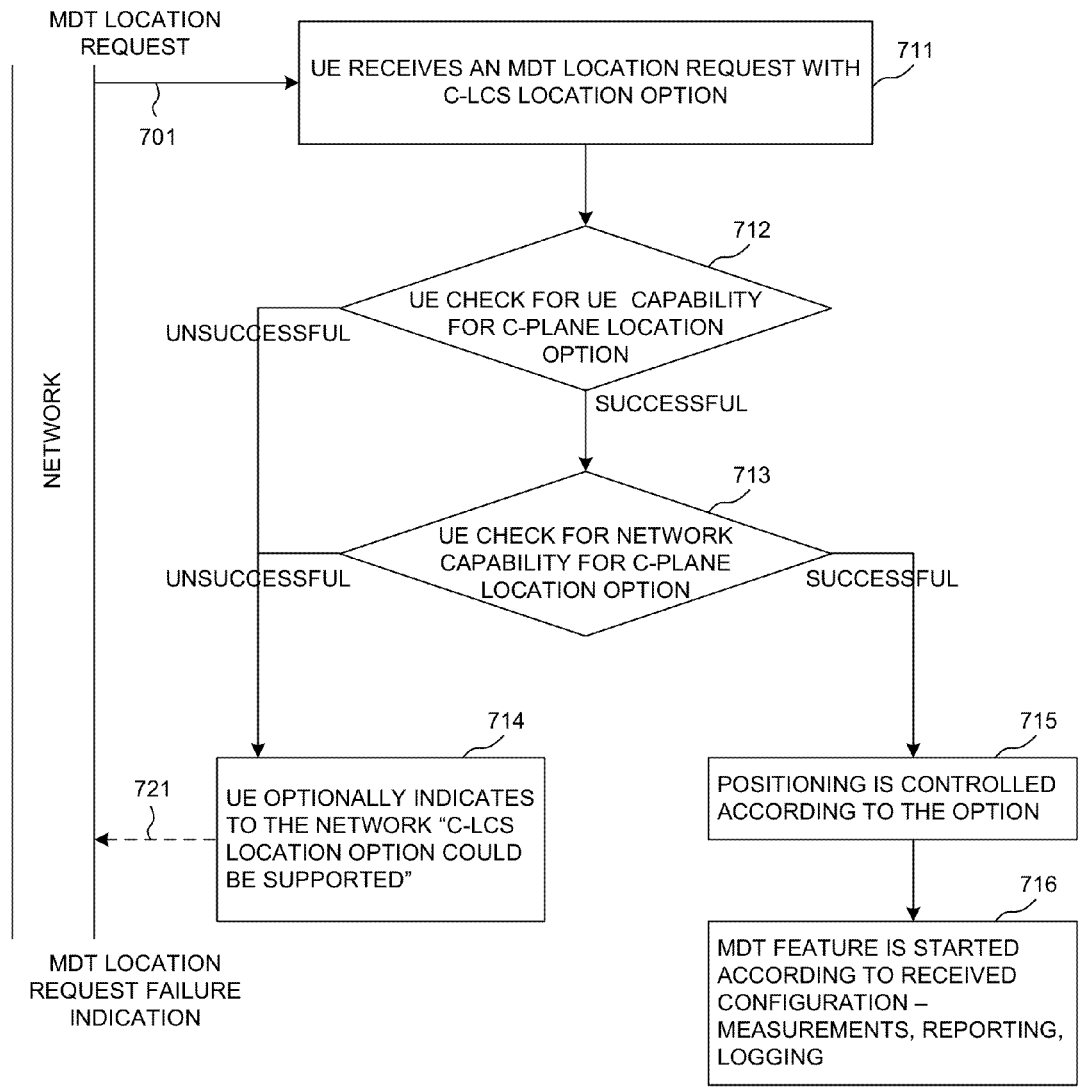
FIG. 7 illustrates UE action when evaluating location options.

FIG. 7 illustrates UE action when evaluating location options in a mobile communication network. In step 701, the network sends an MDT location request to a UE. In step 711, the UE receives the MDT location request comprises an MDT location option configuration. The MDT location option configuration contains one location option (e.g., C-PLANE LCS). In step 712, the UE checks UE capability with respect to C-Plane LCS location option. If the UE supports C-Plane LCS, then the UE goes to step 713 to check network LCS capabilities. For example, the UE checks to what extent the network supports LCS and to what extent UE capabilities and network capabilities match, because C-Plane LCS may involve signaling interaction between the UE and the network, e.g. for LTE with eSMLC by LPP (LTE positioning protocol). If the network and the UE both support C-Plane LCS, then in step 715, positioning is controlled according to this option. A mobile originated location request (MO-LR) is initiated from the UE to the network. Parameters for MO-LR may be hardcoded or provided in the MDT location request, e.g., for periodic location, periodicity would typically be given or deduced from parameters in MDT location request. In step 716, MDT feature is started according to the received configuration for MDT measurements, reporting, and logging. On the other hand, if either of the steps 712 or 713 is unsuccessful, then the UE goes to step 714. The UE optionally indicates to the network that C-PLANE LCS location option could not be supported. In step 721, the network receives a response that indicates the failure of the MDT location request. Based on this embodiment, it can be concluded that the feasibility of using a certain location option is evaluated by taking into account UE capabilities, network capabilities, and maybe other circumstances that are needed for a location option to work (e.g., radio coverage for LTE-based OTDOA).

Figure 8:
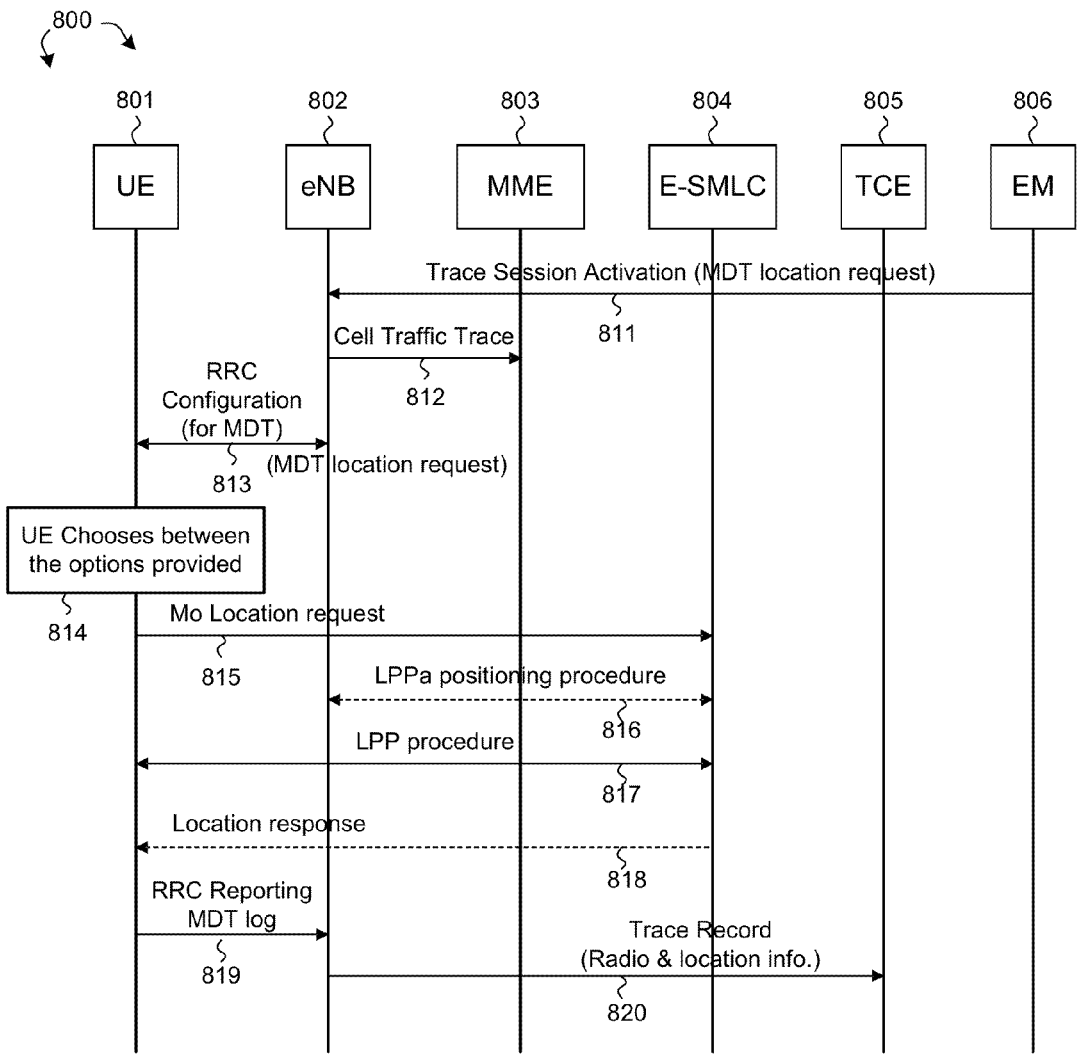
FIG. 8 illustrates a procedure of C-Plane location subsystem with UE-centric MDT logging in accordance with one novel aspect from UE perspective.

FIG. 8 illustrates a procedure of C-Plane location subsystem with UE-centric MDT logging in accordance with one novel aspect. Mobile network 800 comprises a UE 801, a base station (eNB or Radio Network Controller) 802, a Mobility Management Entity (MME) 803, an Enhanced Serving Mobile Location Center (ESMLC) 804, a Trace collection entity (TCE) 805, and an Element Manager (EM) 806. UE 801 is in direct communication with eNB 802, which communicates via MME 803 with ESMLC 804, TCE 805, and EM 806. In step 811, EM 806 communicates trace session activation, including MDT configuration information and MDT location request, to eNB 802. In response, eNB 802 communicates cell traffic trace to MME 803 (step 812). In step 813, eNB 802 communicates Radio Resource Control (RRC) configuration information for MDT to UE 801. The RRC configuration information contains the MDT location request, which contains one or more location options. In step 814, UE 801 chooses between the location options provided. For example, UE 801 chooses to use C-PLANE LCS for location information. In step 815, UE 801 sends a mobile-originated location request (MO-LR) to eSMLC 804. E-SMLC 804 then determines UE location by using stored UE location information, or by performing one or several LPPa positioning procedures in step 816, or by performing a LPP positioning procedure in step 817, or any combination thereof. In response to the location request, in step 818, eSMLC 804 sends a location response back to UE 801. UE 801 then stores MDT reports with location information. After creating a log of the MDT reports, in step 819, UE 801 communicates the MDT log including multiple MDT reports to eNB 802. In step 820, the trace record (including radio and location information) is sent from eNB 802 to TCE 805.

Figure 9:
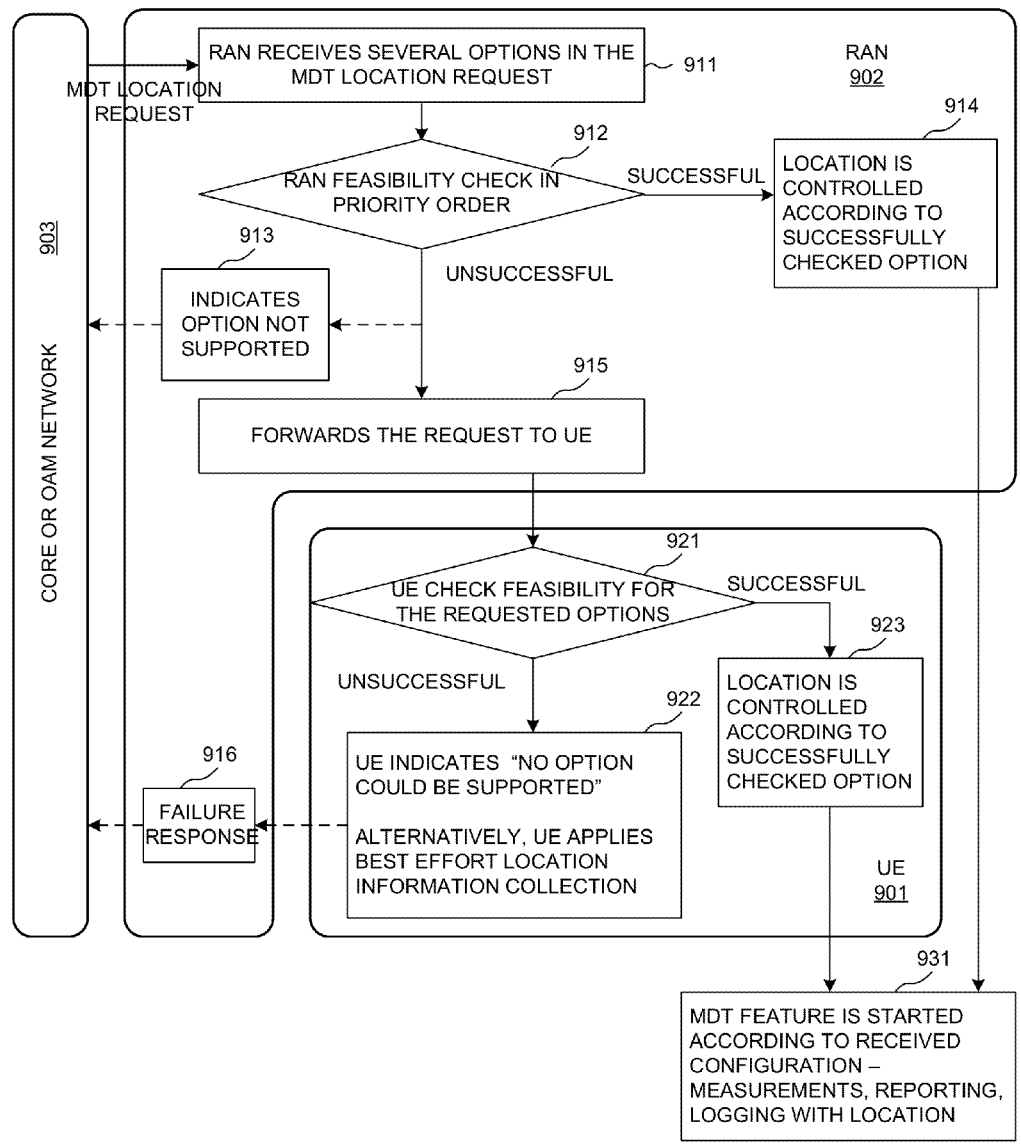
FIG. 9 illustrates RAN action when receiving multiple location options for immediate MDT.

FIG. 9 illustrates RAN action when receiving multiple location options for immediate MDT in a mobile communication network. In step 911, RAN 902 receives an MDT location request from the core or OAM network 903. The MDT location request contains multiple location options. For example, the location options are 1) C-PLANE LCS, 2) UTDOA, and 3) E-CID. In step 912, RAN 902 performs feasibility check for the location options in priority order. More specifically, RAN 902 checks whether RAN 902 can take action to initiate a positioning procedure. If the answer is yes, then RAN 902 goes to step 914. Location is controlled according to the successfully checked option. Otherwise, if RAN 902 cannot initiate any positioning procedure, then in step 913, RAN 902 optionally indicates to network 903 that the requested location options are not supported or just assumes best effort location. If, on the other hand, the requested location options can be supported by UE 901 (e.g., UE GNSS), then RAN 902 forwards the request to UE 901 in step 915. Upon receiving the request, in step 921, UE 901 performs feasibility check for the requested options. If successful, then location is controlled according to the successfully checked option (step 923). In step 931, MDT feature is started according to received configuration for MDT measurements, reporting, and logging with location information. If unsuccessful, then in step 922, UE 901 indicates that no option could be supported. Alternatively, UE 901 applies best effort location information collection. In step 916, RAN 902 optionally forwards a failure response of the MDT location request, if any, to network 903.

Figure 10:
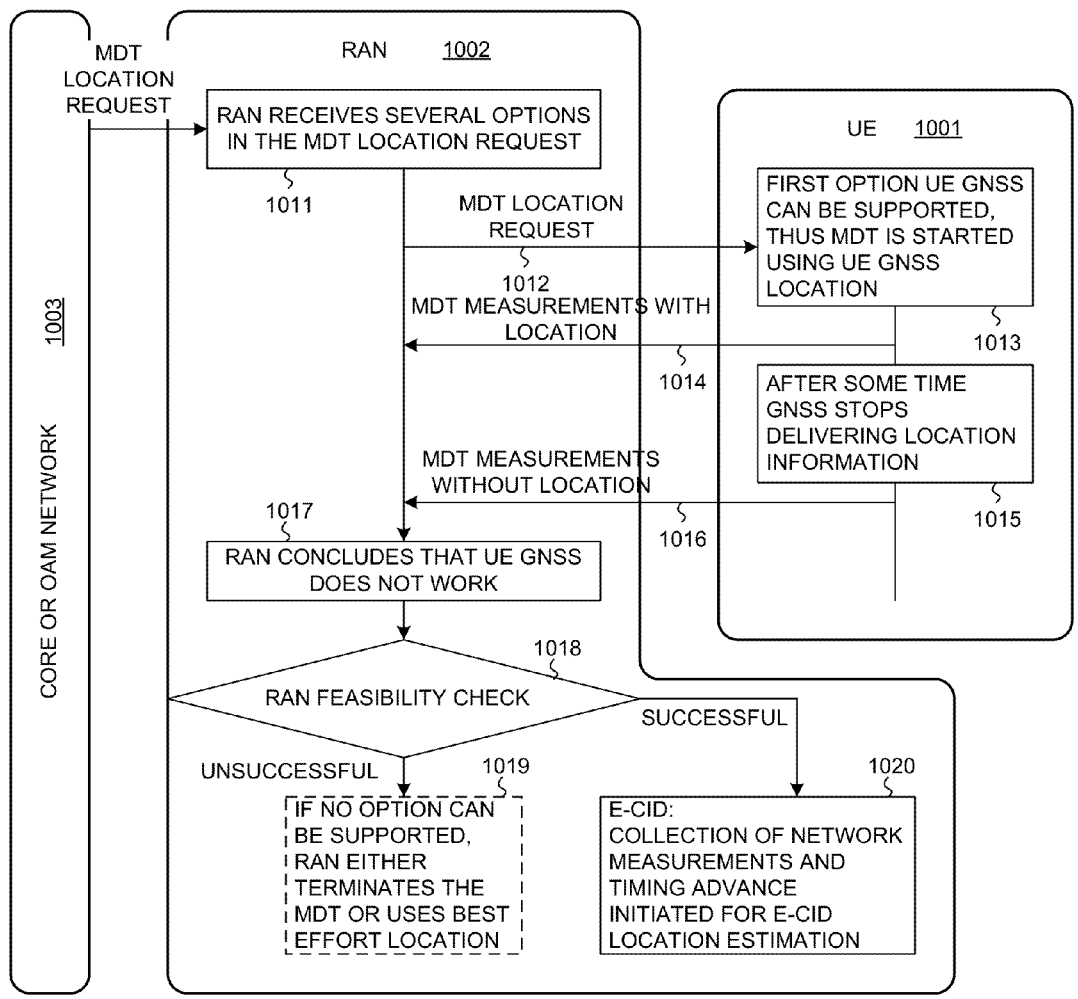
FIG. 10 illustrates RAN action during ongoing MDT when receiving multiple location options for immediate MDT.

FIG. 10 illustrates RAN action during ongoing MDT when receiving multiple location options for immediate MDT in a mobile communication network. In step 1011, RAN 1002 receives an MDT location request from the core or OAM network 1003. The MDT location request contains a UE location option as highest priority (e.g., UE GNSS) and one option that RAN can handle (e.g., one of the options C-Plane LCS selected location, UTDOA, and E-CID). In step 1012, RAN 1002 forwards the MDT location request with the first option (UE GNSS) to UE 1001. In step 1013, MDT is started using UE GNSS location. In step 1014, UE 1001 delivers measurement reports for MDT with location information. Later on, in step 1015, GNSS stops delivering location information, e.g., due to out of GNSS coverage. In step 1016, UE 1001 delivers measurement reports for MDT without location information. In step 1017, RAN 1002 concludes that UE GNSS is no longer working. In step 1018, RAN 1002 performs feasibility check in priority order for other location options. If no option can be supported, then RAN 1002 either terminates MDT or uses best effort location (step 1019). If one of the location option (e.g., E-CID) can be supported, then in step 1020, collection of network measurements and timing advance are initiated by RAN 1002 for E-CID location estimation.

Figure 11:
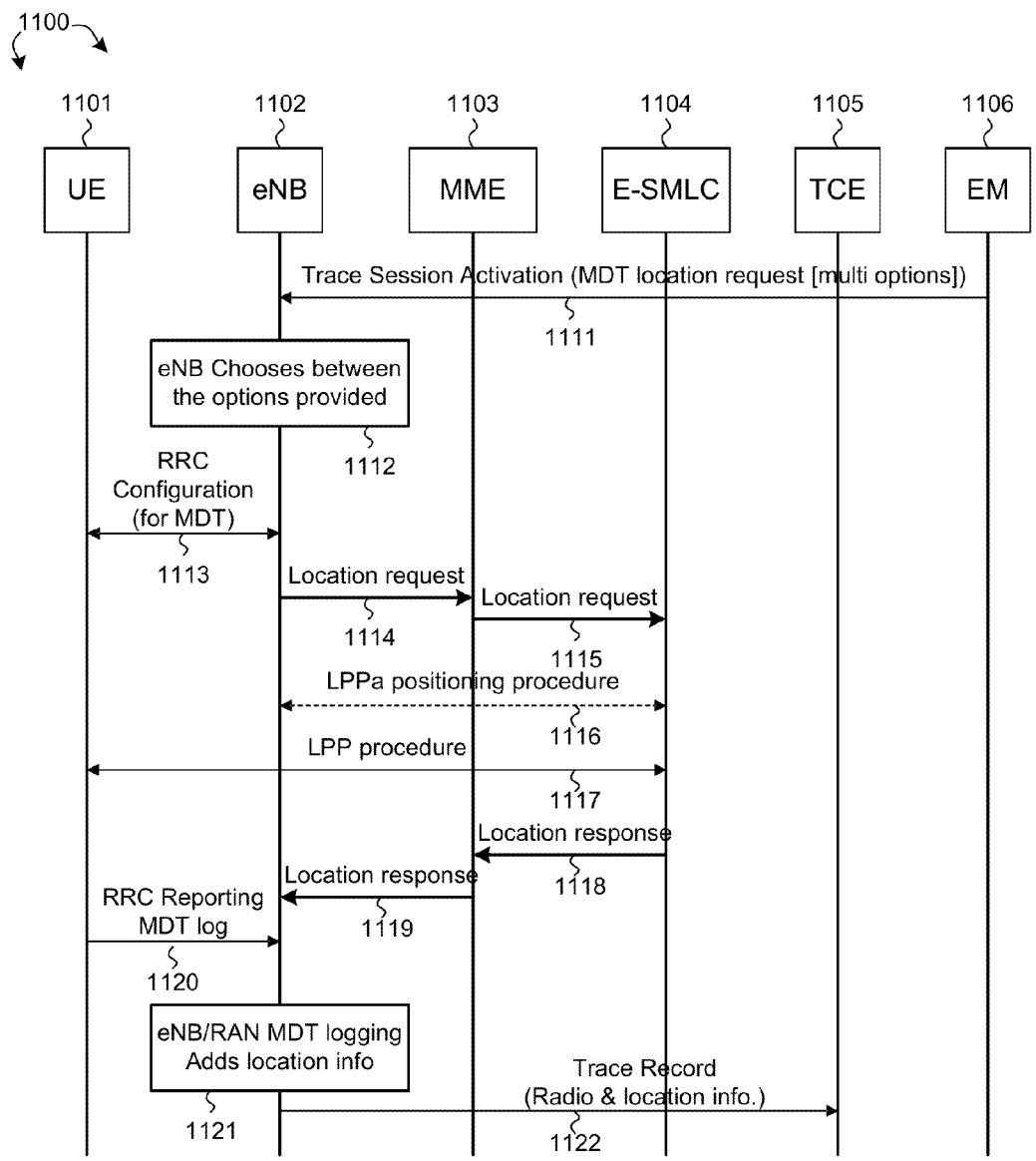
FIG. 11 illustrates a procedure of C-Plane location subsystem with eNB-centric MDT logging in accordance with one novel aspect from RAN perspective.

FIG. 11 illustrates a positioning procedure of C-Plane location subsystem with eNB-centric MDT logging in accordance with one novel aspect. Mobile network 1100 comprises a UE 1101, a base station (eNB or Radio Network Controller) 1102, a Mobility Management Entity (MME) 1103, an Enhanced Serving Mobile Location Center (ESMLC) 1104, a Trace collection entity (TCE) 1105, and an Element Manager (EM) 1106. UE 1101 is in direct communication with eNB 1102, which communicates via MME 1103 with ESMLC 1104, TCE 1105, and EM 1106. In step 1111, EM 1106 communicates trace session activation, which includes MDT configuration information and an MDT location request having multiple location options, to eNB 1102. In step 1112, eNB 1102 chooses between the multiple options provided. For example, eNB 1102 chooses RAN-initiated C-Plane LCS selected location. In step 1113, eNB 1102 communicates Radio Resource Control (RRC) configuration information for MDT to UE 1101. In step 1114, eNB 1102 sends a location request to MME 1103, which forwards the location request to eSMLC 1104 in step 1115. E-SMLC 1104 then determines UE location by using stored UE location information, or by performing one or several LPPa positioning procedures in step 1116, or by performing a LPP positioning procedure in step 1117, or any combination thereof. In response to the location request, in step 1118, eSMLC 1104 sends a location response to MME 1103, which forwards the location response to eNB 1102 in step 1119. In step 1120, UE 1101 communicates the MDT log to eNB 1102 via RRC reporting. In step 1121, eNB 1102 performs logging, and adds location information into the log. Finally, in step 1122, the trace record (including radio and location information) is sent from eNB 1102 to TCE 1105.

Figure 12:
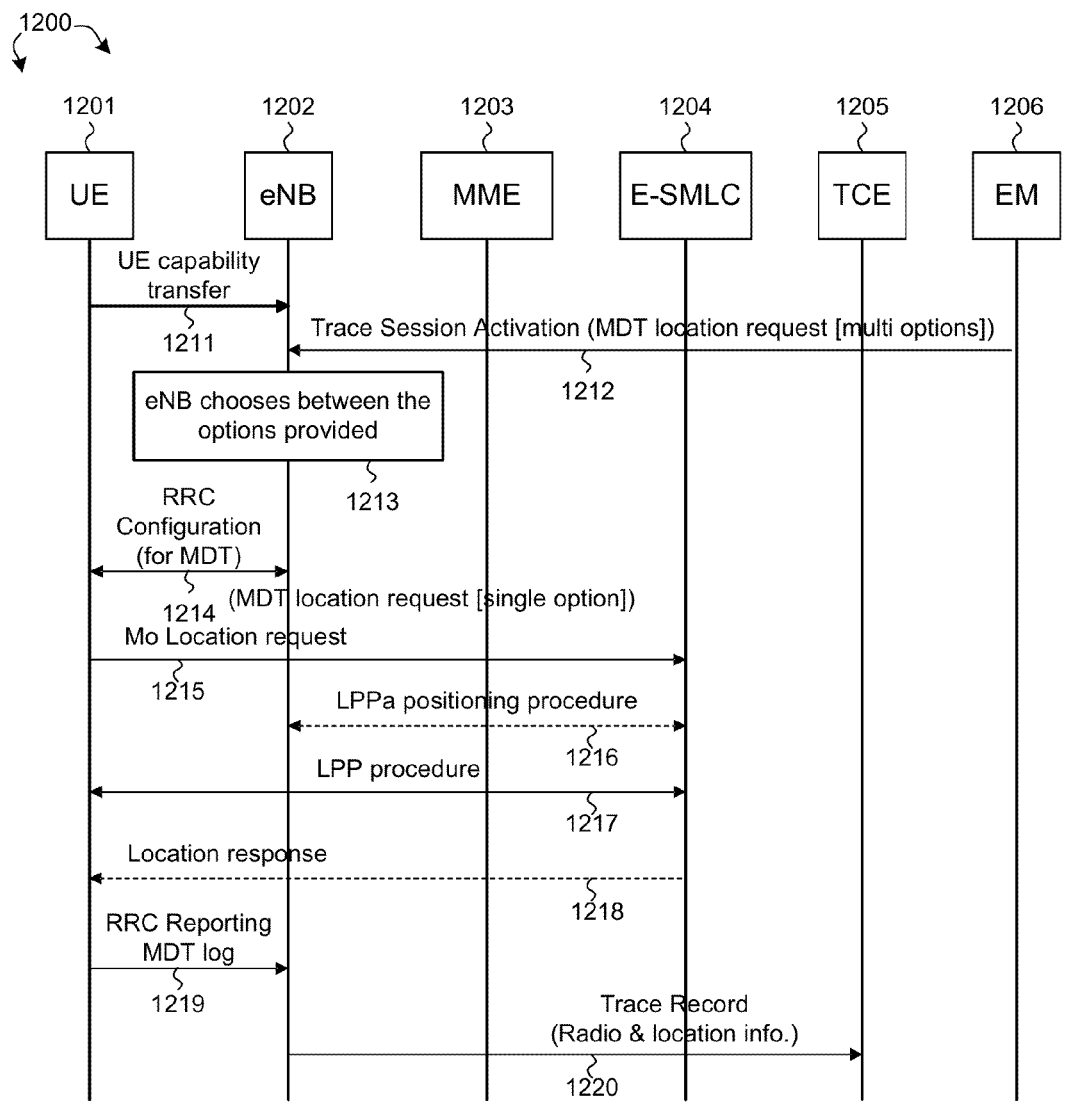
FIG. 12 illustrates a procedure of C-Plane location subsystem with UE-centric MDT logging in accordance with one novel aspect from RAN perspective.

FIG. 12 illustrates a positioning procedure of C-Plane location subsystem with UE-centric MDT logging in accordance with one novel aspect. Mobile network 1200 comprises a UE 1201, a base station (eNB or Radio Network Controller) 1202, a Mobility Management Entity (MME) 1203, an Enhanced Serving Mobile Location Center (ESMLC) 1204, a Trace collection entity (TCE) 1205, and an Element Manager (EM) 1206. UE 1201 is in direct communication with eNB 1202, which communicates via MME 1203 with ESMLC 1204, TCE 1205, and EM 1206. In step 1211, UE 1201 transfers UE capability with respect to location to eNB 1202. In step 1212, EM 1206 communicates trace session activation, which includes MDT configuration information and an MDT location request with multiple location options, to eNB 1202. In step 1213, eNB 1202 chooses between the multiple options provided. For example, eNB 1102 chooses the highest priority option that UE (and the network) is capable of (e.g., UE shall perform MO-LR using C-Plane LCS). In step 1214, eNB 1202 communicates Radio Resource Control (RRC) configuration information for MDT to UE 1201. The RRC configuration information contains the MDT location request with a single option (e.g., MO-LR using C-Plane LCS). In step 1215, UE 1201 sends a mobile-originated location request (MO-LR) to eSMLC 1204. E-SMLC 1204 then determines UE location by using stored UE location information, or by performing one or several LPPa positioning procedures in step 1216, or by performing a LPP positioning procedure in step 1217, or any combination thereof. In response to the location request, in step 1218, eSMLC 1204 sends a location response back to UE 1201. UE 1201 then stores MDT reports with location information. After creating a log of MDT reports, in step 1219, UE 1201 communicates the MDT log to eNB 1202 via RRC reporting. In step 1220, the trace record (including radio and location information) is sent from eNB 1202 to TCE 1205.

Note that the location options may be a specific positioning method, e.g., GNSS, OTDOA, E-CID, etc. Location options may also indicate that positioning is controlled by a specific system. For example, a location option of C-PLANE LCS indicates that positioning is controlled by eSMLC, and a location option of U-PLANE LCS indicates that positioning is controlled by SLP. The eSMLC or SLP will determine exactly how location is to be acquired, e.g., via UE-stored location or LLP or LLPa positioning procedure.

Figure 13:
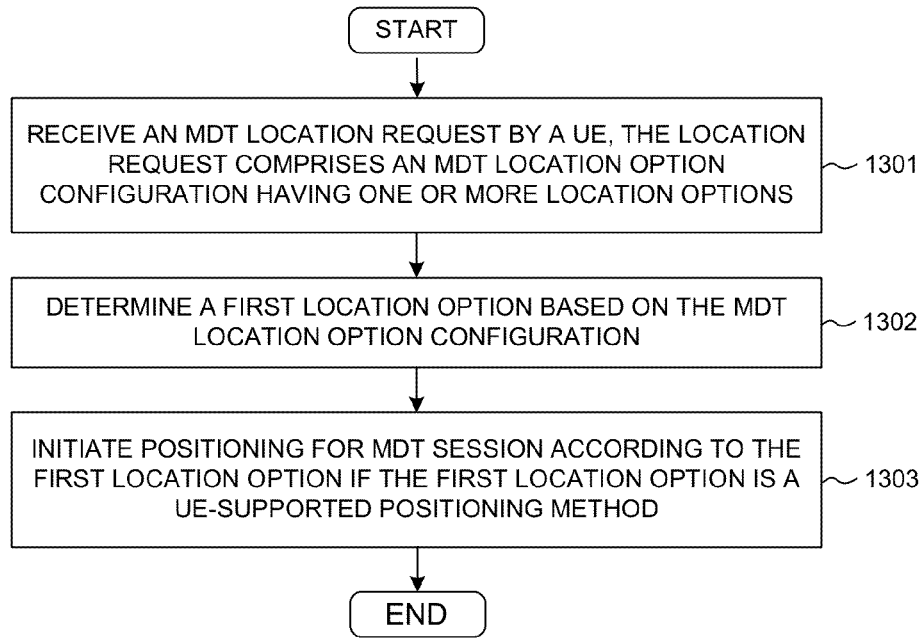
FIG. 13 is a flow chart of MDT location option configuration from UE perspective.

FIG. 13 is a flow chart of MDT location option configuration from UE perspective. In step 1301, a UE receives an MDT location request from a base station. The MDT location request comprises an MDT location option configuration having one or more location options. In step 1302, the UE determines a first location option based on the MDT location option configuration and based on UE capabilities with respect to location. In step 1303, the UE initiates positioning for MDT according to the determined first location option. In one embodiment, each location option is associated with a priority, and the first location option has higher priority than the remaining UE-supported location options.

Figure 14:
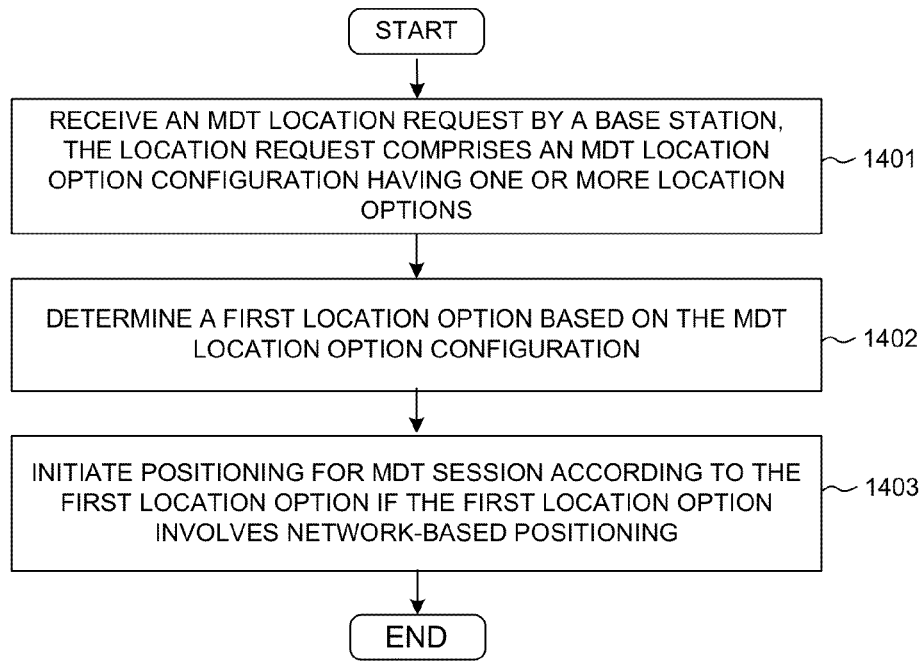
FIG. 14 is a flow chart of MDT location option configuration from eNB perspective.

FIG. 14 is a flow chart of MDT location option configuration from eNB perspective. In step 1401, an eNB receives an MDT location request from a core network or an OAM system. The MDT location request comprises an MDT location option configuration having one or more location options with priority. In step 1402, the eNB determines a first location option based on the MDT location option configuration. In step 1403, the eNB initiates positioning for MDT session according to the first location option if the first location option involves network-based positioning. If a requested location option can be supported by a UE (e.g., UE GNSS), then the eNB may forward the MDT location request to the UE.

Location information is not only important to MDT measurements, but also an important feature for mobile users. In addition to cellular networks, there are other networks (e.g., WLAN) able to deliver location information to mobile users.

Figure 15:
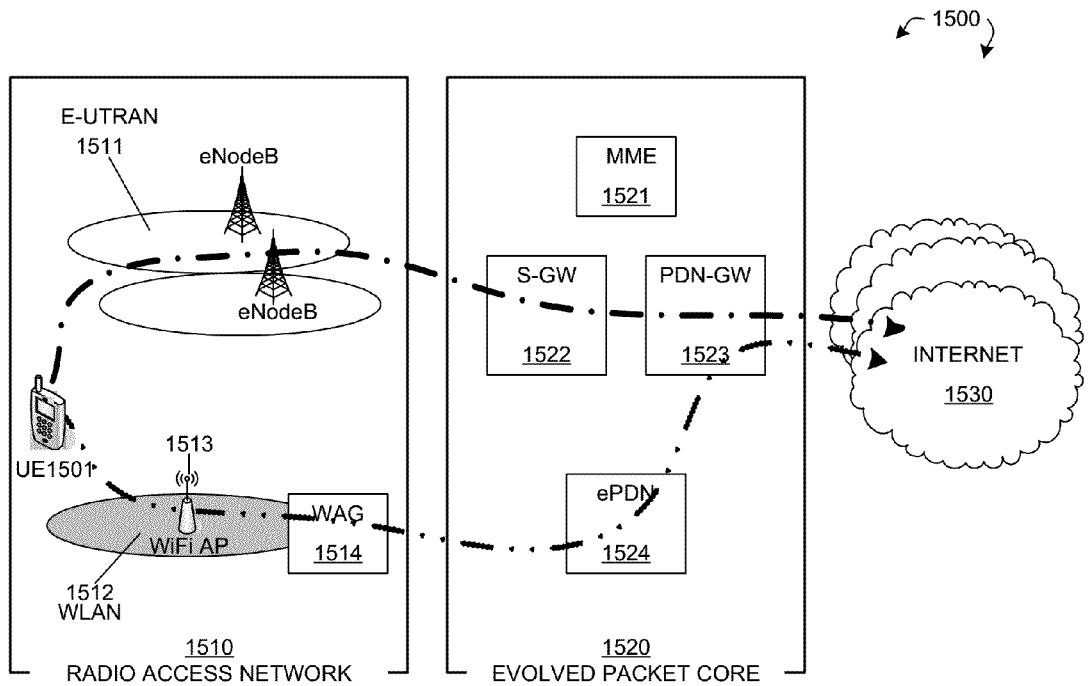
FIG. 15 illustrates an overview of a heterogeneous network having a UE-determined best positioning procedure in accordance with one novel aspect.

FIG. 15 illustrates an overview of a heterogeneous network 1500 having a UE-determined best positioning procedure in accordance with one novel aspect. Network 1500 comprises a UE 1501, a radio access network RAN 1510, an evolved packet core network 1520, and Internet 1530. RAN 1510 includes a cellular E-IRAN 1511 including a plurality of eNBs and a wireless local area network WLAN 1512 including a WiFi AP 1513 and a wireless access gateway WAG 1514. Evolved packet core network includes a mobility management entity MME 1521, a serving gateway S-GW 1522, a PDN gateway PDN-GW 1523, and an enhanced PDN gateway ePDN 1524. From the UE perspective, it is equipped with both a cellular transceiver and a WiFi transceiver, and is able to access application networks such as Internet 1530 via cellular access (e.g., the E-UTRAN path denoted by dashed line with single dot) or WLAN access (e.g., the WLAN path denoted by dashed line with double dots).

When LCS Client requests to locate a target UE (LCS client can resides in the target UE too.), the UE can use a variety of positioning methods. For example, the UE can use standalone GNSS based on satellite systems, AGNSS with network assistance, LTE OTDOA relying on LTE cellular radio signals, WiFi positioning under WLAN coverage, or MEMS technology. In one novel aspect, the UE can prioritize the various positioning methods based on a specific positioning objective, and then determine the best positioning procedure under certain UE environment before the network is involved.

Figure 16:
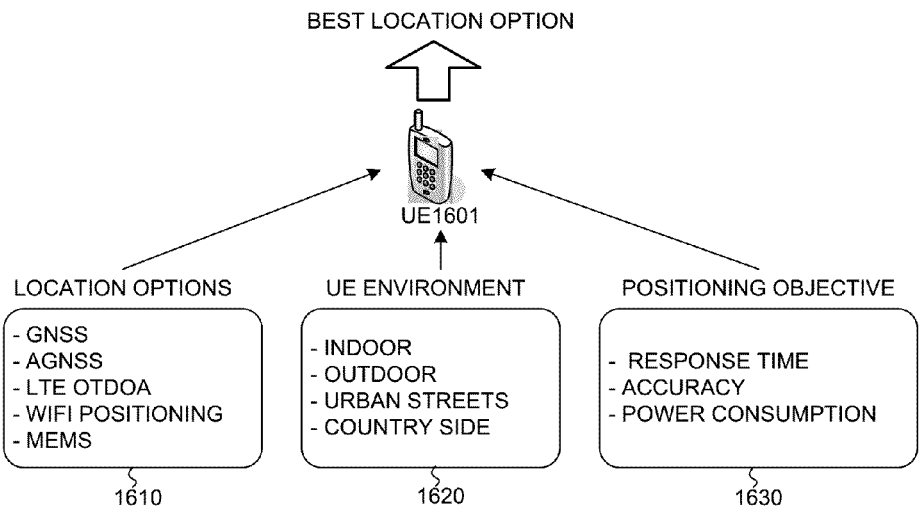
FIG. 16 illustrates a method of determining the best positioning procedure by a UE in accordance with one novel aspect.

FIG. 16 illustrates a method of determining the best positioning procedure by a UE 1601 in accordance with one novel aspect. Box 1610 indicates a list of available positioning methods including GNSS, AGNSS, LTE OTDOA, WiFi positioning, and MEMS. Which positioning method is most suitable depends on two factors. The first factor is the UE environment and signal strength and/or quality, and the second factor is the positioning objective. Box 1620 indicates a UE environment in terms of the area, location, and various signal conditions. For example, for WiFi signals, if the UE is in indoor environment, then WiFi is likely to be available and strong; if the UE is on urban streets, then WiFi is likely to be available but weak; and if the UE is outdoor, then WiFi is likely to be unavailable. On the other hand, for LTE cellular radio signals, if the UE is on urban streets, then LTE cell is likely to be available and strong; if the UE is in indoor environment, then LTE cell is available but weak; and if the UE is at countryside or in deep indoor environment, then LTE cell is likely to be unavailable. Box 1630 indicates different positioning objectives including reduce response time, improve accuracy, and save power consumption. Based on the two factors, UE 1601 is then able to select the best location option from the list of positioning methods that can best satisfy the positioning objective.

Figure 17:
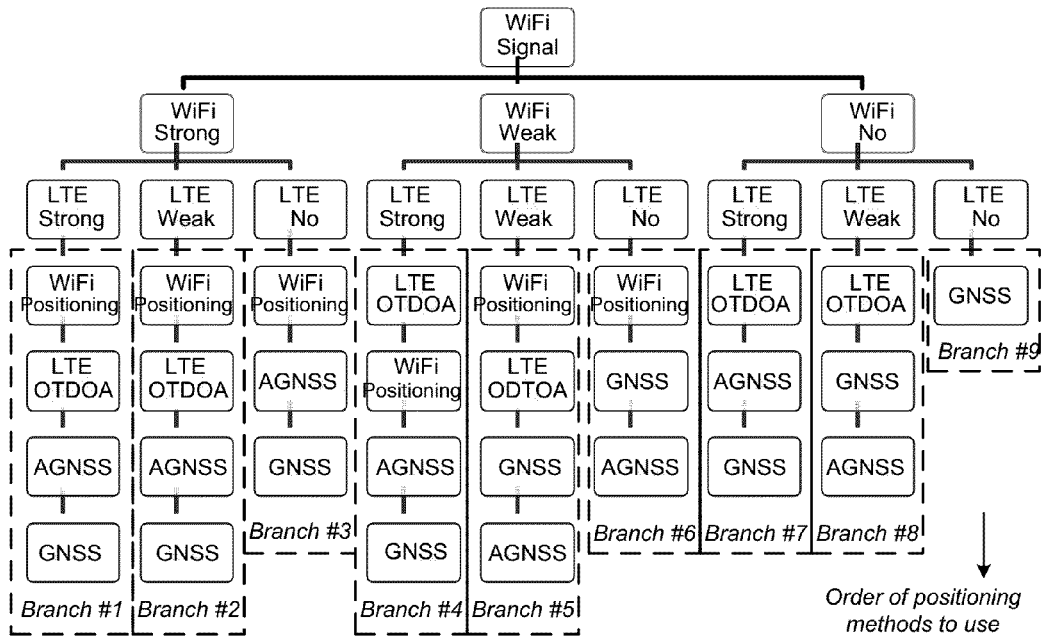
FIG. 17 illustrates a first embodiment of determining a priority order of various positioning methods.

FIG. 17 illustrates a first embodiment of determining a priority order of various positioning methods by a UE. In the example of FIG. 17, fast response time is the objective. The UE tries to provide location information as quick as possible. Upon receiving a location request, the UE first checks the signal strength and/or quality of the WiFi signals. The WiFi signal can be categorized into strong, weak, or unavailable. The UE then checks the signal strength and/or quality of LTE cellular radio signals. The LTE signal can also be categorized into strong, weak, or unavailable. Based on the determinations of the two radio signals, the UE can identify a specific branch for prioritizing the different positioning procedures. Specifically, there are total nine branches and each branch represents one UE environment. Branches 1-3 represent indoor, branches 4 and 7 represent urban streets, branches 5-6 represent dense urban streets or quasi-indoor, branch 8 represents outdoor, and branch 9 represents outdoor or deep indoor. Each branch is associated with a predefined priority order with respect to positioning procedures based on the positioning objective—to reduce response time.

For example, branch #1 indicates WiFi strong and LTE cell strong. Because the positioning objective is response time, and because WiFi positioning is the fastest and GNSS is the slowest, the priority order for executing the different positioning procedures is as follows: WiFi positioning, LTE OTDOA, AGNSS, and GNSS. If WiFi is strong and LTE cell is unavailable (as indicated by branch #3), then the priority order for executing the different positioning procedures becomes WiFi positioning, AGNSS, and GNSS. In another example, branch #4 indicates WiFi weak and LTE cell strong, and the priority order for executing the different positioning procedures becomes LTE OTDOA, WiFi positioning, AGNSS, and GNSS. Because the priority order is defined based on the signal strength of WiFi and LTE cell, the UE can use the best positioning procedure that can provide location information with the shortest response time.

Figure 18:
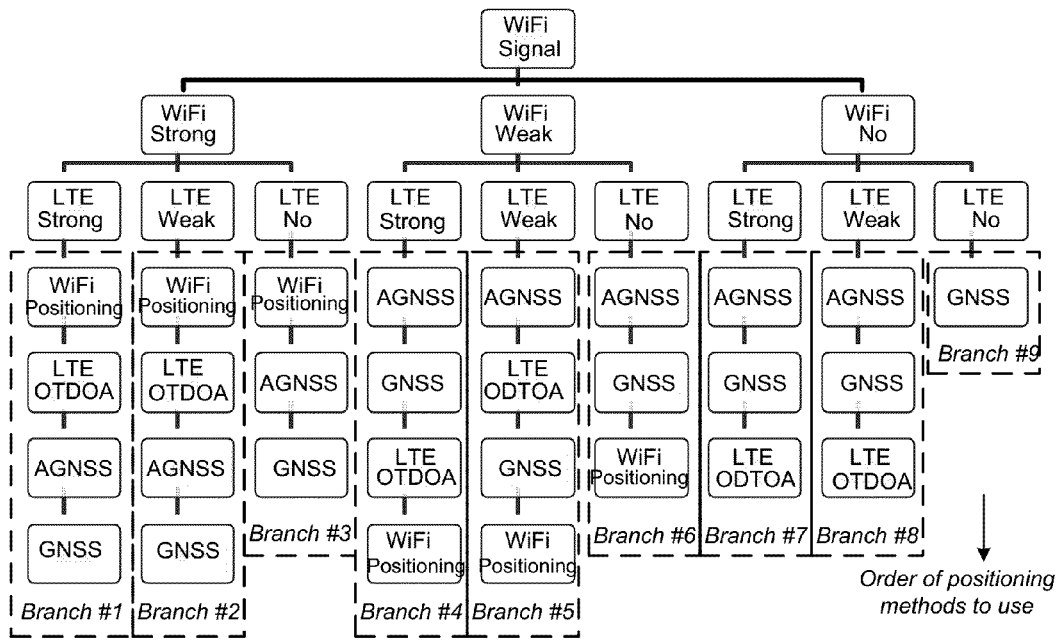
FIG. 18 illustrates a second embodiment of determining a priority order of various positioning methods.

FIG. 18 illustrates a second embodiment of determining a priority order of various positioning methods by a UE. In the example of FIG. 18, high accuracy is the objective. The UE tries to provide location information that is the most accurate. Similar to FIG. 17, there are total nine branches, and each branch represents a UE environment. Upon receiving a location request, the UE checks the signal strength/quality of WiFi and LTE cell and identifies to which one of the nine branches the UE belongs. Each branch is associated with a predefined priority order with respect to positioning procedure based on the positioning objective—to provide the most accurate UE location information.

For example, branch #4 indicates WiFi weak and LTE strong. Because the positioning objective is accuracy, and because AGNSS/GNSS positioning is the most accurate, the priority order for executing the different positioning procedures is as follows: AGNSS, GNSS, LTE OTDOA, and WiFi positioning. Note that the priority order for branch #4 is different between FIG. 17 and FIG. 18 because different positioning objectives are pursued by the UE. Because the priority order is defined based on the signal strength of WiFi and LTE cell, the UE can use the best positioning procedure that can provide the most accurate location information.

Figure 19:
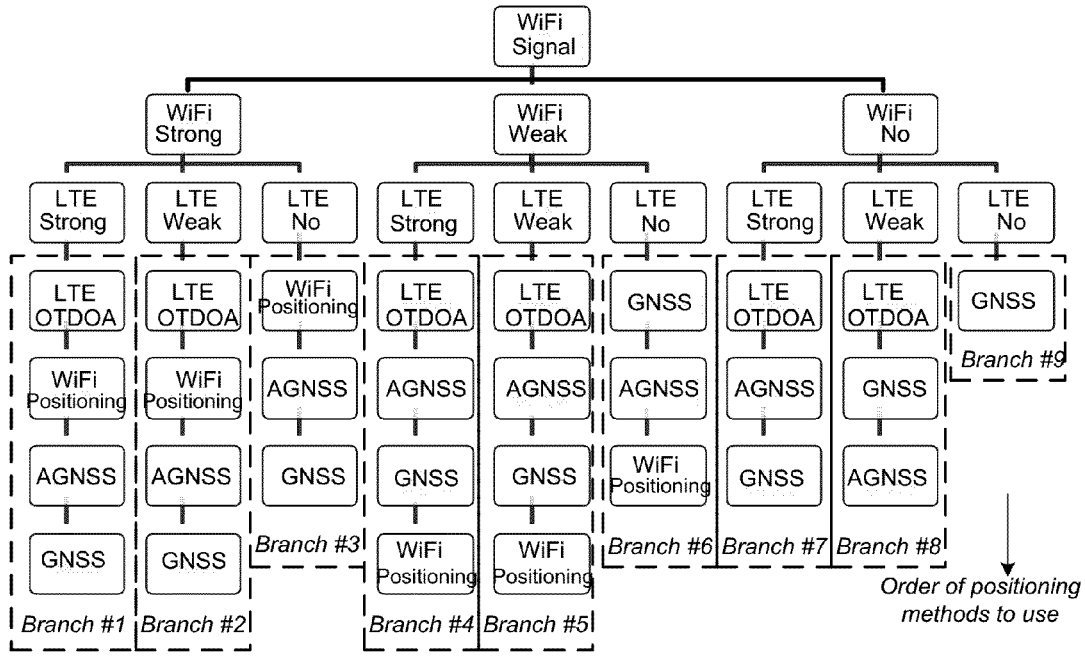
FIG. 19 illustrates a third embodiment of determining a priority order of various positioning methods.

FIG. 19 illustrates a third embodiment of determining a priority order of various positioning methods by a UE. In the example of FIG. 19, low power consumption is the objective. The UE tries to provide location information with the least power consumption. Similar to FIG. 17, there are total nine branches, and each branch represents a UE environment. Upon receiving a location request, the UE checks the signal strength/quality of WiFi and LTE cell and identifies to which one of the nine branches the UE belongs. Each branch is associated with a predefined priority order with respect to positioning procedure based on the positioning objective—to provide UE location information with the least power consumption.

For example, branch #1 indicates WiFi strong and LTE strong. Because the positioning objective is power saving, and because LTE OTDOA positioning produces the most power saving and GNSS/AGNSS consumes the most power, the priority order for executing the different positioning procedures is as follows: LTE OTDOA, WiFi positioning, AGNSS, and GNSS. Because the priority order is predefined based on the signal strength of WiFi and LTE cell, the UE can use the best positioning procedure that can provide UE location information with the least power consumption.

Figure 20:
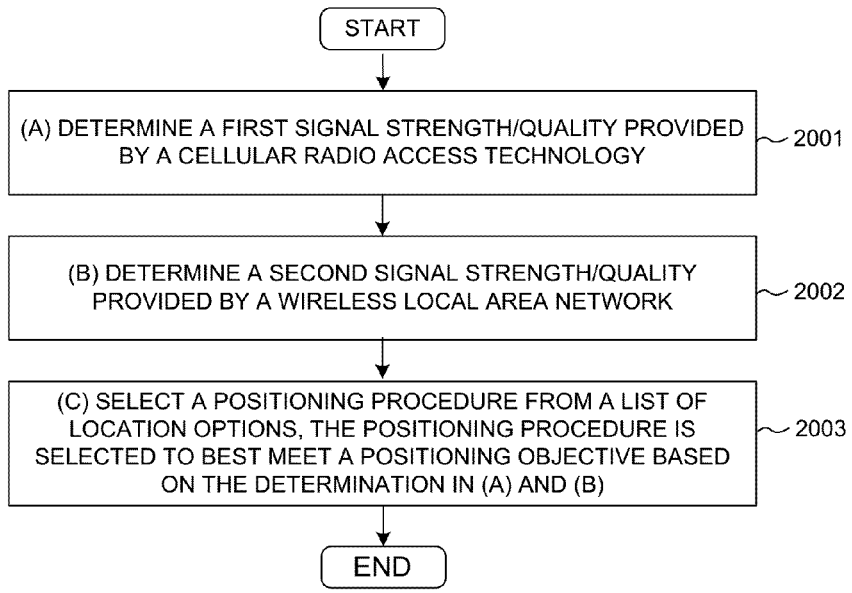
FIG. 20 is a flow chart of a method of determining the best positioning procedure by a UE in accordance with one novel aspect.

FIG. 20 is a flow chart of a method of determining the best positioning procedure by a UE in accordance with one novel aspect. In step 2001, the UE determines a first signal strength/quality provided by a cellular radio access technology (e.g., LTE cell). In step 2002, the UE determines a second signal strength/quality provided by a wireless local area network (e.g., WiFi). Steps 2001 and 2002 can be reversed. In step 2003, the UE selects a positioning procedure from a list of available location options. The selected positioning procedure best meets a provisioning objective based on the first and the second signal strength/quality determination. In one embodiment, the priority order of the various location options is predefined based on the signal quality determination and a specific positioning objective. In addition to LTE OTDOA, WiFi positioning and GNSS/AGNSS, MEMS positioning is a useful positioning method. For example, indoor positioning solution using MEMS Sensor enabled GPS may be able to provide location information with high degree of improved availability and reliability, especially when GPS signals are degraded or not available.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   (a) determining a first signal strength and/or quality provided by a cellular radio access technology (RAT) by a wireless device;
   (b) determining a second signal strength and/or quality provided by a wireless local area network (WLAN) by the wireless device; and
   (c) selecting a positioning procedure from a list of location options, wherein the positioning procedure is selected to best meet a positioning objective based on the determination in (a) and (b).

2. The method of claim 1, wherein the list of location options includes Global Navigation Satellite System (GNSS), Assisted GNSS (AGNSS), LTE Observed Time Difference of Arrival (LTE OTDOA) system, WiFi positioning, and Micro Electro Mechanical Systems (MEMS) positioning.

3. The method of claim 1, wherein the wireless device determines a priority order of executing each location option based on the determining in (a) and (b).

4. The method of claim 1, wherein the positioning objective includes reducing response time.

5. The method of claim 4, wherein a WiFi positioning option has the fastest response time.

6. The method of claim 1, wherein the position objective include improving accuracy.

7. The method of claim 6, wherein a Global Navigation Satellite System (GNSS) positioning option has the best accuracy.

8. The method of claim 1, wherein the positioning objective includes reducing power consumption.

9. The method of claim 8, wherein an LTE Observed Time Difference of Arrival (LTE OTDOA) positioning option has the least power consumption.

10. A wireless device, comprising:
    a cellular transceiver that determines a first signal strength and/or quality provided by a cellular radio access technology (RAT) by a wireless device;
    a WiFi transceiver that determines a second signal strength and/or quality provided by a wireless local area network (WLAN) by the wireless device; and
    a location option controller that selects a positioning procedure from a list of location options, wherein the positioning procedure is selected to best meet a positioning objective based on the determination in (a) and (b).

11. The device of claim 10, wherein the list of location options includes Global Navigation Satellite System (GNSS), Assisted GNSS (AGNSS), LTE Observed Time Difference of Arrival (LTE OTDOA) system, WiFi positioning, and Micro Electro Mechanical Systems (MEMS) positioning.

12. The device of claim 10, wherein the wireless device determines a priority order of executing each location option based on the determining in (a) and (b).

13. The device of claim 10, wherein the positioning objective includes reducing response time.

14. The device of claim 13, wherein a WiFi positioning option has the fastest response time.

15. The device of claim 10, wherein the position objective include improving accuracy.

16. The device of claim 15, wherein a Global Navigation Satellite System (GNSS) positioning option has the best accuracy.

17. The device of claim 10, wherein the positioning objective includes reducing power consumption.

18. The device of claim 17, wherein an LTE Observed Time Difference of Arrival (LTE OTDOA) positioning option has the least power consumption.

* * * * *